United States Patent [19]
Pratt

[11] Patent Number: 5,778,385
[45] Date of Patent: Jul. 7, 1998

[54] LINK MANAGER FOR MANAGING LINKS INTEGRATING DATA BETWEEN APPLICATION PROGRAMS

[75] Inventor: John M. Pratt, Atkinson, N.H.

[73] Assignee: Kodak Limited, Hemel Hempstead, England

[21] Appl. No.: 891,240

[22] Filed: Jul. 10, 1997

Related U.S. Application Data

[63] Continuation of Ser. No. 309,824, Sep. 21, 1994, abandoned.

[51] Int. Cl.$^6$ .................................................. G06F 9/40
[52] U.S. Cl. ..................................................... 707/200
[58] Field of Search .................................. 395/616, 617, 395/618, 619, 620; 707/200

[56] References Cited

U.S. PATENT DOCUMENTS

| | | | |
|---|---|---|---|
| 5,287,453 | 2/1994 | Roberts | 395/200.31 |
| 5,475,843 | 12/1995 | Halviatti et al. | 395/704 |
| 5,485,617 | 1/1996 | Stutz et al. | 395/683 |
| 5,495,607 | 2/1996 | Pisello et al. | 707/10 |
| 5,517,645 | 5/1996 | Stutz et al. | 395/680 |
| 5,537,585 | 7/1996 | Blickenstaff et al. | 395/621 |

FOREIGN PATENT DOCUMENTS

| | | |
|---|---|---|
| A0369961 | of 0000 | European Pat. Off. . |
| A0500252 | of 0000 | European Pat. Off. . |
| A0578207 | of 0000 | European Pat. Off. . |

OTHER PUBLICATIONS

DiLascia, Paul, "OLE made almost easy: creating containers and servers using MCF 2.5", Microsoft Systems Journal, v9, n4, p. 13(17), Apr. 1994.

Primary Examiner—Alvin Oberley
Assistant Examiner—St.-John Courtenay, III
Attorney, Agent, or Firm—Gary D. Clapp

[57] ABSTRACT

A link manager for a computer system including data objects and application programs for performing operations on the data objects wherein container objects contain references to linked data residing in server objects and including a link mechanism for invoking a server application program for providing linked data to a presentation window. The link manager includes a reference selector selecting a single reference to linked data in a container object and a moniker generator to generate a moniker identifying a server object containing the linked data. The link mechanism responds to the moniker pointer by invoking a server application program to open the server object and provide the linked data to the presentation window. Each reference includes a file name and a path name and a search mechanism determines the server object directory path, which is used in generating the moniker. The link manager responds to a second reference by modifying the moniker to identify a second server object and the link mechanism reuses the link by closing the first application program and server object and invoking a second server application program to open the second server object and provide the linked data to the presentation window. A moniker manager allows the opening of plural links, each with a moniker, but directs the moniker generator to modify and reuse a previous moniker and link when at a preseleted limit.

2 Claims, 3 Drawing Sheets

SYSTEM 10

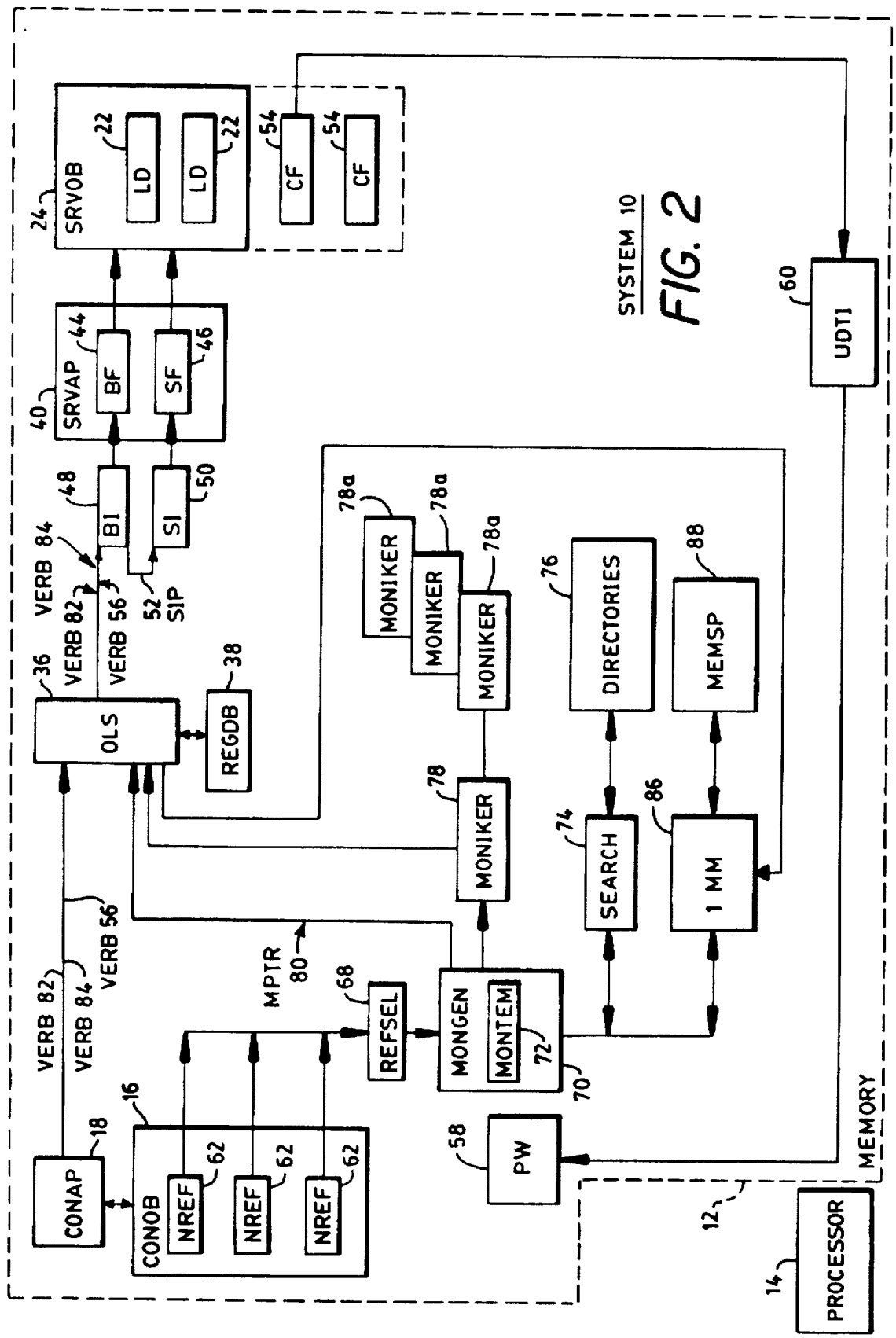

LINK MANAGER FOR MANAGING LINKS INTEGRATING DATA BETWEEN APPLICATION PROGRAMS

CROSS REFERENCES TO RELATED APPLICATIONS

This is a Continuation of application Ser. No. 08/309,824, filed Sep. 21, 1994 now abandoned.

This patent application is related to:

FIELD OF THE INVENTION

The present invention relates to a mechanism for integrating data between applications programs executing in an integrated operating environment by linking of data operated upon by a first application program into data operated upon by a second application program by embedding a reference to first data operated upon by the first application program into second data operated upon by the second application program and, more particularly, for an improved mechanism for the linked integration of data.

BACKGROUND OF THE INVENTION

Recent years have seen the development and adoption of integrated operating environments, such as Microsoft Windows™ and New Wave™, for virtually all computer data processing systems wherein an integrated operating environment is comprised of operating system functions together with a plurality of other functions, such as user interface and data exchange and integration functions, which may be used in common by applications programs written to execute in the integrated operating environment.

Such integrated operating environments usually provide a data integration mechanism by which data created by a first application program and residing in a first file or object belonging to the first application program and usually referred to as a "server object", may be integrated, or linked, into data created by a second application program and residing in a second file or object, usually referred to as a "container object", so that the linked data appears to the user as if it were residing in the data of the container object. Microsoft Windows, for example, provides an Object Linking and Embedding (OLE) mechanism for linking a copy of data from a first data file into a second data file and a Uniform Data Transfer Interface (UDTI) and Dynamic Data Exchange (DDE) mechanism for transferring or exchanging data from one file to another.

The integration of data between applications programs in integrated operating environments of the prior art customarily involves the embedding of a reference to the linked data in the data of the container object at the location in the data that the linked data is to appear. The data linking mechanisms of the integrated operating environment are then responsive to the invocation of the second application program and the loading of the container object to resolve the reference to linked data from the server object and to invoke the first application program or local handler to open the container object. The data exchange mechanisms of the integrated operating environment will then operate with the first application program or local handler to provide a current copy of the linked data from the source object to the second application by means of a link cache and presentation window created and maintained by the first application program or local handler. The copy of the linked data will then appear to the user as if it were residing in the data of the container object at the location indicated by the reference, and the functions and capabilities of the invoked first application program, or the equivalent functions of the local handler, are available to the user to perform operations on the linked data.

A container object in an integrated operating environment having a data linking mechanism can include a plurality of links to data from other server objects and each such link can be of a different type of data and therefore generated by a different application program, with the above process being repeated for each link in the container object file.

Data integration mechanisms therefore require not only the loading and invocation of the application program and the container object containing references to linked data each time the container object is operated upon, but also the resolution of each link to identify the application program that created the linked data and the server object containing the linked data, the loading and invocation of each application program that generated linked data, or an equivalent local handler, the loading of each server object containing linked data, and the loading and invocation of the OLE, UDTI and DDE mechanisms and other related system functions and data structures.

It is therefore apparent that data linking mechanisms require significant system resources. For example, the application program of each server object must maintain and store, for each link, information identifying and describing the link and a link cache for storing the linked data, thereby significantly increasing the storage and memory requirements of each server object.

In addition, each time that a container object is loaded to be operated upon the system must load and invoke the container object application program, identify and resolve each link in the container object, load and invoke of each application program that generated linked data, or an equivalent local handler, loading each server object containing linked data, and load and invoke the OLE, UDTI and DDE mechanisms and related system functions and data structures. This in turn significantly increases the memory space required to load and operate upon a container object as it is necessary to also load and execute the object linking and data exchange services and related data structures and the server object and application program together with a cache file and presentation window for each link in the container object.

These processes, such as resolving each link reference and loading and invoking the linking and data exchange services and invoking each linked application program, also significantly increase the time required to initiate an application program and begin editing on a data object.

Many data linking mechanisms fail, often unrecoverably, under low memory conditions or when the system runs out of memory and, as a result, it is often necessary to either increase system memory accordingly or to restrict the permitted number of links and volumes of linked data. This in turn either increases system cost or restricts the utility of the data integration functions. This is a particularly severe problem, for example, in laptop and notebook computers, which typically contain limited memory, but can also be a problem in desktop units, such as personal computers, and can be a problem even in mid-range and large computers.

Finally, it has been described above that an essential operation in linking data from a server object to a container object is the resolution of the links to identify and locate the server object or objects. Most data integration mechanisms locate server objects through the combination of a file name and directory path descriptor stored in association with the corresponding link and this can result in broken or lost links when server objects are relocated in a system, for example, when a server object is moved to a different directory, or even to a different system in the instance of networked systems. For example, Microsoft Windows is capable of locating a server object that has been moved to another disk drive so long as the directory path to the server object remains the same as when the link was originally created, but cannot locate the server object if the directory path to the object has changed.

The present invention provides a solution to these and other problems of the data integration methods of the integrated operating environments of the prior art.

SUMMARY OF THE INVENTION

The present invention is directed to a link manager for use in a computer system including a plurality of data objects for storing data and a plurality of application programs for performing operations on the data objects wherein the data objects include container objects and server objects and the container objects contain references to linked data residing in the server objects. The system further includes a memory and processor for storing and executing the application programs and an integrated operating environment including a link mechanism responsive to a moniker corresponding to a linked data reference and identifying a corresponding server object containing the linked data for loading and invoking a server application program for performing operations on the corresponding server object, the server application program being responsive to the link server mechanism for providing the linked data to a presentation window.

The link manager includes a reference selector responsive to a user input selecting a first single reference to linked data in the container object and a moniker generator storing a template of a moniker and responsive to the first selected reference to linked data to generate a first moniker identifying a first server object containing the linked data identified by the first reference from the template and the selected reference and to provide a moniker pointer identifying the moniker to the link mechanism.

The link mechanism is then responsive to the moniker pointer for reading the moniker, identifying a first server application program corresponding to the first server object, and directing the first server application program to open the first server object and a presentation window and to provide the linked data to the presentation window.

Further according to the present invention, each reference to linked data is comprised of a file name and a path name and the link manager further includes a search mechanism responsive to the file name of a reference to linked data for searching directories of the system to locate the server object corresponding to the file name when the file name cannot be located and determining the directory path to the server object corresponding to the file name. The search mechanism then provides the directory path to the moniker generator and the moniker generator uses the directory path in generating the moniker, which includes the directory path identifying the location of the server object containing the linked data in the system. The link manager of the present invention also includes a moniker editor responsive to a user for modifying the moniker.

Still further according to the present invention, the reference selector is responsive to a second user input selecting a second single reference to linked data in the container object and the moniker generator responds to the second reference to linked data by modifying the moniker to identify a second server object containing the linked data corresponding to the second reference and providing the moniker pointer identifying the modified moniker to the link mechanism. The link mechanism is then responsive to the moniker pointer for reading the moniker, directing the first server application program to close the first server object, identifying a second server application program corresponding to the second server object, and directing the second server application program to open the second server object and provide the linked data to the presentation window, thereby reusing the system resources invoked for the first reference.

In a further embodiment of the present invention, the link manager may create successive monikers for successively selected references to linked data and the link manager further includes a moniker manager responsive to the number of existing monikers and to a preselected limit number for determining when the number of monikers generated by the moniker generator will exceed the preselected limit number.

In this instance, the moniker manager will respond to a next reference to linked data by directing the moniker manager to select and edit an existing moniker to create a modified moniker identifying a new server object containing the linked data corresponding to the next reference and provide the moniker pointer identifying the modified moniker to the link mechanism. The link mechanism will then respond to the moniker pointer by reading the modified moniker and directing the server application program for the server object corresponding to the selected existing moniker to close the server object corresponding to the selected existing moniker and to exit the system. The link mechanism will then be directed to respond to the modified moniker by identifying a new server application program corresponding to the new server object and the link manager will direct the new server application program to open the new server object and provide the linked data to the presentation window, thereby reusing the system resources invoked for the replaced link.

In yet another embodiment of the present invention wherein the link manager may create successive monikers for successively selected references to linked data the moniker manager will monitor the available memory space for storing the server object, the server application program, the linked data and the moniker of a next reference to linked data and will respond to the memory space required for storing the server object, the server application program, the linked data and the moniker of a next reference to linked data by determining when the memory space required for storing the server object, the server application program, the linked data and the moniker of a next reference to linked data is less than the available memory space for storing the server object by less than a preselected value.

In this instance, the moniker manager will again direct the moniker manager to respond to a next reference to linked data by selecting and modifying an existing moniker to create a modified moniker identifying a new server object containing the linked data corresponding to the next reference and providing the moniker pointer identifying the modified moniker to the link mechanism. The link mechanism will then again respond to the moniker pointer by reading the modified moniker and directing the server application program for the server object corresponding to the selected existing moniker to close the server object corresponding to the selected existing moniker and to exit the system. The link mechanism will then be directed to respond to the modified moniker by identifying a new server application program corresponding to the new server object and the link manager will direct the new server application program to open the new server object and provide the linked data to the presentation window, thereby reusing the system resources invoked for the replaced link.

Other features, objects and advantages of the present invention will be understood by those of ordinary skill in the art after reading the following descriptions of a present implementation of the present invention, and after examining the drawings, wherein:

DESCRIPTION OF THE INVENTION

The link manager of the present invention may best be understood by first discussing a typical data linking mechanism of the prior art, such as the Microsoft Windows OLE mechanism. The following will therefore first describe a typical data linking mechanism of the prior art, using the Microsoft Windows OLE mechanism as the illustrative example, and will then describe the link manager of the present invention.

It will therefore be assumed in the following description of a data linking mechanism of the prior art and the link manager of the present invention that the data linking mechanisms of the prior art and the link manager of the present invention are implemented in an integrated operating environment having the functionality and capabilities exemplified in and found in and Microsoft Windows and, in particular, the Windows OLE 2.0 mechanism and related Windows mechanisms. The functionality and capabilities of Microsoft Windows are well known to those in the relevant arts and is well described in readily available publications, such as "Windows 3.1 Programmer's Reference" by James W. McCord and published by Que Corporation and "Inside OLE 2" by Kraig Brockschmidt and published by Microsoft Press, which are incorporated herein by reference as necessary. As such, many of the linking mechanism functions and elements described hereinafter will not be described in detail where these functions and elements are either already well known to those of ordinary skill in the relevant or are described in commonly available publications, such as "Windows 3.1 Programmer's Reference" by James W. McCord and "Inside OLE 2" by Kraig Brockschmidt.

A. Description of Prior Art Data Linking Mechanisms (FIGS. 1 and 1A)

Figure 1:
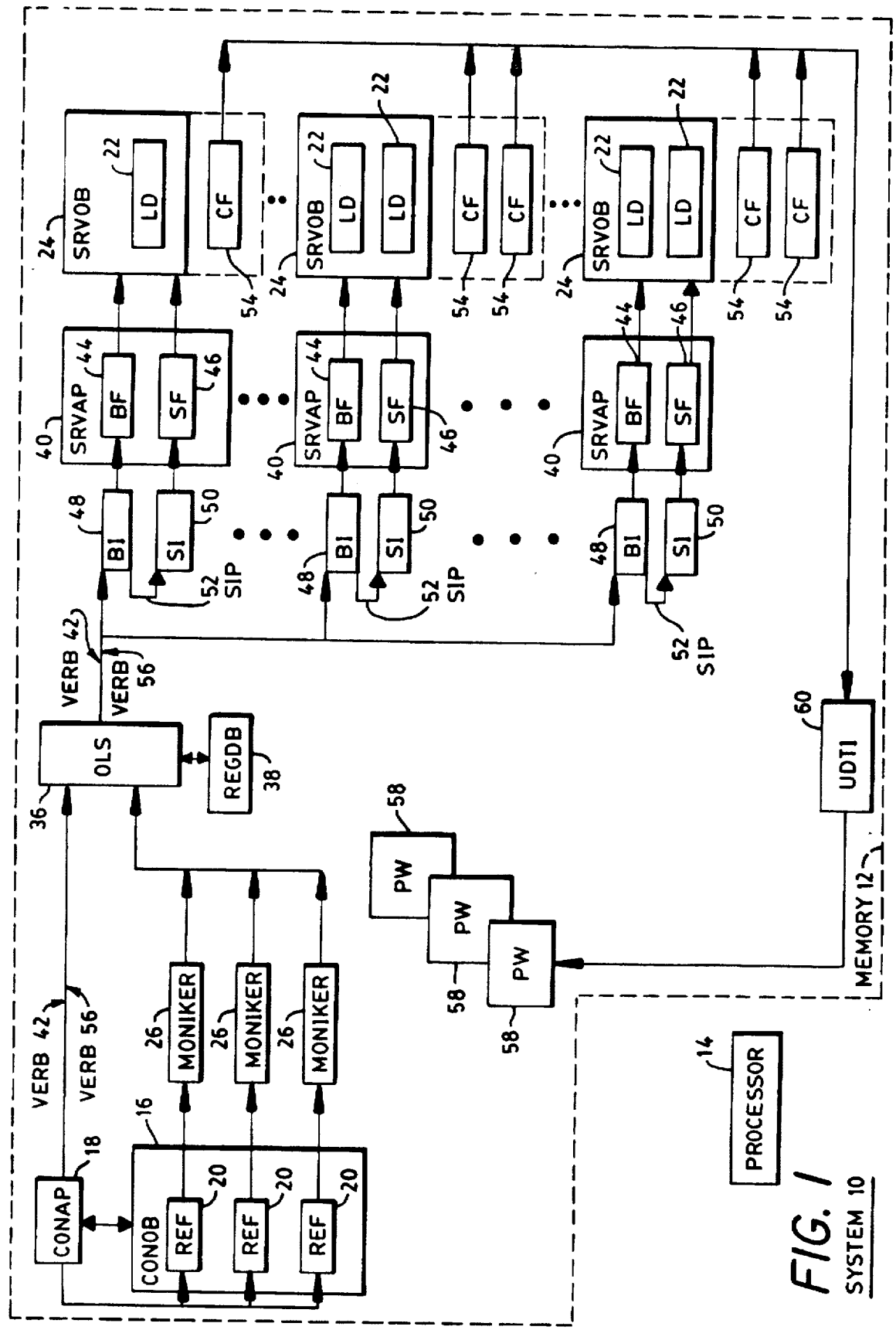
FIG. 1 is a diagrammatic representation of a data integration mechanism of the prior art.
Figure 1A:
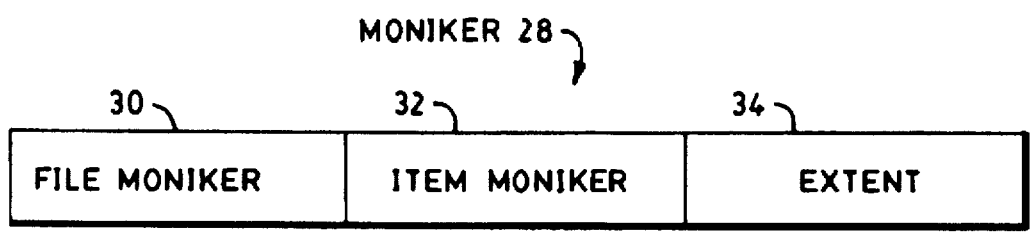
FIG. 1A is a diagrammatic representation of a moniker of the data integration mechanism of the prior art.

FIG. 1 is a diagrammatic representation of a System 10 incorporating a typical data linking mechanism of the prior art and having a Memory 12 and a Processor 14 with a Container Object (CONOB) 16 residing in Memory 12 and Container Application Program (CONAP) 18, residing in Memory 12 and executing through Processor 14, for performing user directed operations on CONOB 16.

As indicated in FIG. 1, a CONOB 16 may contain one or more References (REFs) 20, each to a corresponding instance Linked Data (LD) 22 from one or more Server Objects (SRVOBs) 24. In the Windows environment, each REF 20 is a pointer reference to an associated Moniker 26 and, as represented in FIG. 1A, each Moniker 26 is a composite of a File Moniker 28 and an Item Moniker 30 wherein the File Moniker 28 is a pathname to the SRVOB 24 containing the liked data referred to by the REF 20.

A File Moniker 28 may be a simple file name or a recital of a full path to the associated SRVOB 24, including the disk drive the SRVOB 24 resides in. A Moniker 26 actually contains two File Monikers 28, one being a full pathname and including the disk drive designation and the second being a relative pathname, for example, with the disk drive designation or the CONAP 18 root directory name left out. The Item Moniker 30, in turn, is a name or designation of the SRVOB 24 which is intelligible to the COMAP 18 which created the SRVOB 24. Finally, a File Moniker 28 will include an Extent 34 which designates the portion of the data within the SRVOB 24 that comprised the LD 22.

A user will initiate operations upon a CONOB 16 by invoking CONAP 18 and directing CONAP 18 to open the CONOB 16. At this time, the CONAP 18 will detect each REF 20 in CONAP 18 and will pass the REFs 20, one at a time, to Object Linking Servers (OLS) 36, for example, through Windows IOleClientSite:: and IAdviseSink:: interfaces.

OLS 36 is comprised of the Object Linking and Embedding (OLE) mechanisms of the Microsoft Windows operating environment and the functions, operations and structures of Windows OLE are well known and understood in the art without further detailed description.

Associated with OLS 36 is a Registration Database (REGDB) 38 which, as well known and understood in Windows OLE, is comprised of a database which relates object types with the applications programs which created the objects and thus have the methods and procedures necessary to operate on the object. As such, OLS 36 accepts an REF 20, locates and reads the Moniker 28 referenced by the REF 20, and accesses REGDB 38 to identify the Server Application Program (SRVAP) 40 which created the corresponding SRVOB 24.

OLS 34 then invokes the identified SRVAP 40 and passes the File Moniker 30, Item Moniker 32 and Extent 34 to the SRVAP 40, together with a Verb 42 that is passed to OLS 40 by CONAP 18 together with the REF 20 and which indicates an action to be taken by the SRVAP 40. The SRVAP 40 uses the File Moniker 28 information and the Verb 42 to locate and open the SRVOB 24 that contains the LD 22 in the manner described below.

Referring briefly to SRVAPs 40, it will be noted that, as illustrated in FIG. 1, each SRVAP 40, and in fact each CONAP 18, is comprised of at least one and usually two or more groups or sets of methods or procedures for operating on the corresponding SRVOBs 24 and CONOBs 16. These groups or sets of methods or procedures are represented in FIG. 1 as Base Functions (BFs) 44 and Specific Functions (SFs) 46 wherein BFs 44 are the basic methods and routines common to all application programs adhering to the standards of the operating environment, such as Open file. SFs 46 are the methods and routines specific to a particular corresponding object type, such as the methods and routines for operating on documents for a word processing program.

Each SRVAP 40 and CONAP 16 correspondingly has two interfaces through which a user or, for example, OLS 36, can access and invoke the methods and routines of BFs 44 and SFs 46, each interface essentially comprising a set of pointers or references relating an indicated action, such as by a Verb, to the corresponding method or routine. These interfaces are represented in FIG. 1 as, respectively, Base Interface (BI) 48 and Specific Interface (SI) 50. As indicated in FIG. 1, a BI 48 will include among its pointers or references a Specific Interface Pointer (SIP) 52, which is a pointer or reference to the associated SI 50 or SIs 50, and SFs 46 are accessed by first accessing the BI 48 to locate the associated SI 50 or SIs 50 and then accessing the SFs 46 through a SI 50.

Referring now briefly to the SRVOBs 24, as indicated in FIG. 1 each SRVOB 24 containing an LD 22 will have associated with the LD 22, as part of the SRVOB 24 data or file structure, a Cache File (CF) 54 which stores a copy of the LD 22 data. There will be a CF 54 for and corresponding to each LD 22 in the SRVOB 24 and the Extent 32 of the Moniker 28 will identify both the location and extent of the LD 22 in the SRVOB 24 and the corresponding associated CF 54.

As described just above, OLS 36 will load and invoke the identified SRVAP 40, or at least the BFs 44 of the identified SRVAP 40, and the BFs 44 of the identified SRVAP 40 will respond to the Verb 42 and the File Moniker 28 information by locating and opening the identified SRVOB 24 containing the LD 22 indicated by the REF 20 and opening the CF 54 containing the copy of the referenced LD 22.

At this point, the reference originally provided to OLS 36 has been resolved and the OLS 36 will accept the next REF 20 from CONAP 18 and will execute the same sequence as described above to resolve this new reference, with this sequence being repeated for each REF 20 residing in the CONOB 16.

In summary, therefore, the loading of a CONOB 16 having linked data from other objects involves not only the loading of the CONOB 16's CONAP 18, but the loading and invocation of the link mechanism and data structures, such as OLS 36 and REGDB 38, and the loading and resolution of all Monikers 28 corresponding to REFs 20 in the CONOB 16, which in turn involves the loading of each of the SRVOBs 24 containing linked data together with each of the associated CFs 54 and the loading and invocation of at least the BI 48 and BFs 44 of each of the SRVAPs 40 corresponding to the SRVOBs 24 containing linked data.

As has been discussed, this process is time consuming and requires significant system memory to contain all of the loaded and invoked mechanisms, data structures, methods and procedures.

Finally, it should be noted that the user may issue a Verb 56 through CONAP 18 indicating that the user wishes to perform an operation upon a specific instance of linked data, such as viewing or editing the linked data, and this Verb 56 will be passed to BI 48 and BFs 44 of the corresponding SRVAP 40. The BI 48 and BFs 44 of the corresponding SRVAP 40 will respond by loading and invoking the SRVAP 40's SFs 46 to perform the requested operation and by invoking, through the operating environment facilities, a Presentation Window (PW) 58 in which the linked data from the CF 54 is displayed, providing the linked data through the Windows Uniform Data Transfer Interface (UDTI) 60 mechanism as necessary.

At this point the user may view the linked data or perform operations on the linked data, the full group or set of methods and routines of the SRVAP 40 having been loaded and invoked and thus available to the user.

It must be further noted, however, that each invocation of operations upon an instance of linked data in the CONOB 16 will generally result in the loading and invocation of the SFs 46 of a SRVAP 40. The SFs 46 of a SRVAP 40 usually comprise the majority of the method and procedure code of an SRVAP 40, thereby very significantly increasing the system memory required to hold and execute the methods and procedures of the fully invoked SRVAPs 40. The resulting system memory requirements are further compounded in that the basic and specific methods and procedures of an invoked SRVAP 40 will generally not be unloaded from system memory until the SRVAP 40 is explicitly exited, thereby again significantly increasing the system memory requirements when a user makes successive invocations of SRVAPs 40 with first exiting previously invoked SRVAPs 40.

Figure 2A:
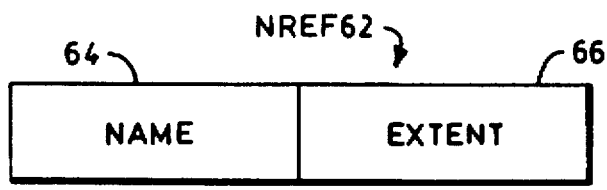
FIG. 2 is a diagrammatic representation of the data integration mechanism of the present invention; and, FIG. 2A is a representation of a linked data reference of the present invention.

B. The Data Integration Mechanism of the Present Invention (FIGS. 2 and 2A)

Referring to FIG. 2, therein is a diagrammatic representation of the exemplary System 10, but incorporating the link manager of the present invention. As shown therein, System 10 again includes a Memory 12 and a Processor 14 with a Container Object (CONOB) 16 residing in Memory 12 and Container Application Program (CONAP) 18, residing in Memory 12 and executing through Processor 14, for performing user directed operations on CONOB 16.

The CONOB 16 may again contain one or more references, each to a corresponding instance Linked Data (LD) 22 from one or more Server Objects (SRVOBs) 24. In the link mechanism of the present invention, however, each reference to linked data is a Name Reference (NREF) 62 is a not a pointer reference to an associated Moniker 26 as in the System 10 of FIG. 1. Each NREF 62, as represented in FIG. 2A, is instead the Name 64 of the SRVOB 24 containing the linked data LD 22, together with an Extent 66 identifying the location and extent of the LD 22 in the SRVOB 24.

A user will initiate again operations upon a CONOB 16 by invoking CONAP 18 and directing CONAP 18 to open the CONOB 16. At this time, however, the CONAP 18 will not automatically search for and detect each NREF 62 in CONAP 18, but instead will only display CONOB 16 to the user, together with the user interface of CONAP 18.

As shown in FIG. 2, the link manager of the present invention differs from that illustrated in FIG. 1 by including several new mechanisms, including a Reference Selector (REFSEL) 68 which is responsive to inputs of the user for selecting any one of REFs 62, reading the selected NREF 62, and passing the Name 64 and Extent 66 stored therein to a Moniker Generator (MONGEN) 70 which contains a Moniker Template (MONTEM) 72.

MONGEN 70 responds to the Name 64 and Extent 66 of the selected NREF 62 by invoking a Search Server (Search) 74 if the stored file and path name cannot be found. Search 74 in turn invokes the file search facilities of the Windows operating environment, such as found in the Windows File Manager, to search all Directories 76 accessible to System 10, including all disk drives, memories and other storage devices and all directories and sub-directories, to locate the SRVOB 24 identified by the Name 64. Search 74 then returns the full directory path identifying the location of the SRVOB 24 identified by the Name 64 to MONGEN 70.

It should be noted that since the OLE links are not stored in the CONAP 18 but are built dynamically at run time, the user is free to modify the links at any time, which is not possible with the links of the prior art systems which store the absolute file name when the links are created. For this reason, MONGEN 70 further includes a moniker editor responsive to user inputs to allow the user to modify a moniker, and thus a link referenced by a Name 64 with its file and path names, at any time.

MONGEN 70 uses the full directory path returned by Search 74, the Extent 66 and the MONTEM 72 to construct a Moniker 78 having a File Moniker 30, an Item Moniker 32 and an Extent 34.

MONGEN 70 then invokes OLS 36, causing OLS 36 to be loaded and executed, and passes a Moniker Pointer (MPTR) 80 identifying the Moniker 78 to OLS 36, for example, through Windows IOleClientSite:: and IAdviseSink:: interfaces, together with a Verb 82 from CONAP 18.

OLS 36 will respond to the MPTR 80 and Verb 82 by accessing REGDB 38 to identify the Server Application Program (SRVAP) 40 which created the corresponding SRVOB 24.

OLS 34 will then load and invoke the identified SRVAP 40, or at least load and invoke the BFs 44 of the identified SRVAP 40, and pass the File Moniker 30, Item Moniker 32 and Extent 34 of the Moniker 78 to the SRVAP 40 together with the Verb 82 received by OLS 40 from CONAP 18. The SRVAP 40 uses the File Moniker 78 information and the Verb 82 to locate and open the SRVOB 24 and associated CF 54 that contains the LD 22 in the manner described above. The SRVAP 40 will also open a PW 58 to display the linked data, and will provide the linked data through a Dynamic Data Exchange (UDTI) 60 mechanism as necessary.

At this point, the NREF 62 has been resolved and the linked data indicated by the user is presented to the user through the PW 58.

At this time, the link manager of the present invention does not seek and a next NREF 62 in CONOB 16 and issue a next Moniker 78 to OLS 36, but instead pauses for the next action by the user.

If the user issues a Verb 56 through CONAP 18 indicating that the user wishes to perform an operation upon the linked data, such as editing the linked data, the Verb 56 will be passed to BI 48 and BFs 44 of the SRVAP 40. The BI 48 and BFs 44 of the corresponding SRVAP 40 will respond by loading and invoking the SRVAP 40's SFs 46, so that the full group or set of methods and routines of the SRVAP 40 are loaded and available to the user to edit the linked data.

If the user wishes to open another instance of linked data in CONOB 16, will user will use REFSEL 68 to select and pass the corresponding new NREF 62 to MONGEN 70. MONGEN 70 will note that an instance of Moniker 78 is already in existence and will respond to the new NREF 62 by issuing a Verb 84 from SONAP 18 to the previously invoked SRVAP 40 wherein the Verb 84 directs the SRVAP 40 to close itself and the previously opened SRVOB 24 and its associated CF 54.

MONGEN 70 will then resolve the new Name 64 and Extent 66 of the new NREF 62 through Search 74, as described above, and by editing the existing Moniker 78 to contain the corresponding new File Moniker 30, Item Moniker 32 and Extent 34.

MONGEN 70 will then pass MPTR 80 and the Verb 82 to OLS 36, which will respond to the MPTR 80 and Verb 82 by reading the new version of Moniker 78 and accessing REGDB 38 to identify the Server Application Program 40 which created the SRVOB 24 contained the newly referenced LD 22.

OLS 34 will then load and invoke the newly identified SRVAP 40, or at least load and invoke the BFs 44 of the newly identified SRVAP 40, and pass the File Moniker 30, Item Moniker 32 and Extent 34 of the new version of Moniker 78 to the SRVAP 40 together with the Verb 82 received by OLS 40 from CONAP 18. The SRVAP 40 uses the File Moniker 78 information and the Verb 82 to locate and open the new SRVOB 24 and associated CF 54 that contains the newly identified LD 22 in the manner described above. OLS 36 will also pass the newly invoked SRVAP 40 an identification of the previously opened a PW 58 and the SRVAP 40 will use the existing PW 58 to display the linked data, providing the linked data through a Uniform Data Transfer Interface (UDTI) 60 mechanism as necessary.

At this point, the new NREF 62 has been resolved and the linked data indicated by the user is presented to the user through the PW 58. The user may then invoke the specific functions of SRVAP 40 to edit the linked data, as described above, or may selected a new instance of linked data to display, as described just above.

It is therefore apparent that the operation of the link manager of the present invention differs significantly from the data linking mechanisms of the prior art.

First, the link manager of the present invention does not automatically scan a newly opened CONOB 16 to identify and resolve any references to linked data contained therein, but instead opens and displays only the CONOB 16. The link manager of the present invention thereby significantly reduces the system memory required to open a CONOB 16 by not automatically invoking even a single reference to linked data, thereby avoiding the memory space overhead required to invoke and execute the OLS 36 functions and even a single SRVOB 24 with its associated CFs 54 and the BI 48, SI 50 and BFs 40 of an associated SRVAP 40, and a PW 58.

Instead, the link manager of the present invention invokes OLS 36 and opens an instance of linked data only upon specific command by the user that the user wished to display or operate upon an instance of linked data.

Further, when the user does wish to display or operate upon an instance of linked data in the CONOB 16, the link mechanism of the present invention opens and invokes only the single, specifically identified instance of linked data with its associated SRVOB 24, the single CF 54 containing the specifically referenced LD 22, the BI 48, SI 50 and BFs 40 of the associated SRVAP 40, and a single PW 58, thereby again minimizing the memory space required to support data linking function.

Still further, in a presently preferred embodiment of the present invention the linking mechanism reduces the system memory required to support the data linking functions by opening only a single instance of linked data at any given time and, when the user wishes to open a new instance of linked data, "reusing" the system memory resources used in the opening of a previous instance of linked data. As described, the link manager of the present invention generates a single Moniker 78 and opens a single instance of a SRVOB 24 with a single, specifically identified CF 54, loads and invokes only the single SRVAP 40 corresponding to the opened SRVOB 24, and creates a single PW 58. Thereafter, the linking mechanism of the present invention "reuses" the single Moniker 78 by modifying the existing Moniker 78 to reflect the newly selected linked data reference, closes the presently open SRVOB 24 and its SRVAP 40, opens the SRVOB 24 and single CF 54 containing the new instance of linked data, and displays the new instance of linked data through the existing PW 58.

Alternate embodiments of the link manager of the present invention permit the opening of multiple instances of linked data but avoid the problems of system resource limitations by limiting the number of instances of open instances of linked data to remain within the available system memory space. As represented in FIG. 2, this implementation of the present invention includes a Moniker Manager (MM) 86 which interacts with MONGEN 70.

In one implementation of this alternate embodiment of the linking mechanism of the present invention, MONGEN 70 is allowed to create up to a predetermined or preselected number of Monikers 78, the additional Monikers 78 being represented in FIG. 2 as Monikers 78a, wherein the number of additional Monikers 78ais based upon an estimate of the available system memory space and the system memory space required for each opened instance of linked data. MM 86 monitors the number of current Monikers 78/78aand, when the predetermined or preselected number of Monikers 78/78areaches the selected limit, reuses existing Monikers 78/78afor new openings of instances of linked data in the manner described above. The selection of existing Monikers 78/78afor reuse may be based, for example, on selecting the oldest existing Moniker 78/78aor on the least recently used Moniker 78/78a.

In another implementation of this alternate embodiment, MM 86 will monitor the currently available system memory space to determine whether sufficient system memory space is available to load a new instance of linked data or whether it is necessary to reuse an existing instance. For this purpose, MM 86 is provided with linked data size information from the moniker Extent 34 and may obtain information required to load an SRVAP 40 from the OLS 36 mechanisms and information regarding currently available system memory space from either the appropriate Windows functions or from operating system functions, generally indicated as Memory Space (MEMSP) 88. MM 86 will then allow MONGEN 70 to create new Monikers 78/78afor newly selected instances of linked data so long as sufficient system memory space exists for each new instance, but will direct MONGEN 70 to reuse an existing instance of linked data as described above if the existing system memory space is not sufficient for a new instance of linked data.

Finally, and as described above, the link manager of the present invention identifies each instance of linked data by a file Name 64 and path, rather than through a directory path name. In addition, the link manager of the present invention includes the capability to search all Directories 76 accessible to System 10 if the stored file name and path cannot be located, including all disk drives, memories and other storage devices and all directories and sub-directories, to locate the SRVOB 24 identified by the Name 64 and return the full directory path identifying the location of the SRVOB 24 identified by the Name 64. The link manager of the present invention thereby eliminates the problem of lost or broken paths by determining the location of and directory path to each SRVOB 24 containing linked data dynamically and at the time the reference is invoked and based solely upon the file name rather than upon any predetermined directory path information.

The link manager of the present invention also allows the user to modify the location file name in the CONAP 18 without updating any embedded link information and, for this reason, MONGEN 70 further includes a moniker editor responsive to user inputs to allow the user to modify a moniker, and thus a link referenced by a Name 64 with its file and path names, at any time.

Those of skill in the relevant arts will readily understand from the following description of the present invention how to implement the present invention using the functionality and capabilities of Microsoft Windows and how to adapt the present invention to other operating system environments, such as New Wave and Macintosh™. As such, the following description of the invention will include only such detail as is necessary to understand the implementation and operation of the present invention, but will not include a detailed description of the elements of Microsoft Windows that are used to implement the present invention as such detailed descriptions of these elements are readily and publicly available, as in the above referenced publications.

What is claimed is:

1. In a computer system including a plurality of data objects for storing data and a plurality of applications programs for performing operations on the data objects, the data objects including container objects and server objects and the container objects containing references to linked data residing in the server objects, a memory and processor for storing and executing the application programs, and an integrated operating environment including a link mechanism responsive to a moniker corresponding to a linked data reference and identifying a corresponding server object containing the linked data for loading and invoking a server application program for performing operations on the corresponding server object, the server application program being responsive to the link server mechanism for providing the linked data to a presentation window, and a link manager including a reference selector responsive to a user input selecting a first single reference to linked data in the container object, and a moniker generator for storing a template of a moniker and responsive to the first selected reference to linked data for generating from the template and the selected reference a first moniker identifying a first server object containing the linked data identified by the first reference and providing to the link mechanism a moniker pointer identifying the moniker, the link mechanism being responsive to the moniker pointer for reading the moniker, identifying a first server application program corresponding to the first server object, and directing the first server application program for opening the first server object, opening a presentation window for presenting the linked data, and providing the linked data to the presentation window, the link manager including a search mechanism for locating unresolvable references, wherein each reference to linked data is comprised of a file name and a path name, comprising:

the search mechanism responsive to the file name of a reference to linked data for
determining when a file name cannot be located and, when and only when a file name cannot be located, determining a directory path to the server object corresponding to the file name by
searching only local directories of the system to locate the server object corresponding to the file name when the file name cannot be located,
determining the directory path to the server object corresponding to the file name, and
providing the directory path to the moniker generator, and
the moniker generator responsive to the directory path provided from the search mechanism for generating the moniker including the directory path identifying the location in the system of the server object containing the linked data.

2. In a computer system including a plurality of data objects for storing data and a plurality of applications programs for performing operations on the data objects, the data objects including container objects and server objects and the container objects containing references to linked data residing in the server objects, a memory and processor for storing and executing the application programs, and an integrated operating environment including a link mechanism responsive a moniker corresponding to a linked data reference and identifying a corresponding server object containing the linked data for loading and invoking a server application program for performing operations on the corresponding server object, the server application program being responsive to the link server mechanism for providing the linked data to a presentation window, wherein a method for managing linked data reference includes the steps of selecting a first single reference to linked data in the container object, and storing a template of a moniker and in response to the first selected reference, generating from the template and the selected reference a first moniker identifying a first server object containing the linked data identified by the first reference and providing to the link mechanism a moniker pointer identifying the moniker, and in the link mechanism, responding to the moniker pointer by reading the moniker, identifying a first server application program corresponding to the first server object, and directing the first server application program to open the first server object, open a presentation window for presenting the linked data, and provide the linked data to the presentation window, a method for locating unresolvable references, wherein each reference to linked data is comprised of a file name and a path name, comprising the steps of:

in response to a file name
determining when a file name cannot be located and when and only when a file name cannot be located, determining a directory path to the server object corresponding to the file name by
searching only local directories of the system to locate the server object corresponding to the file name when the file name cannot be located,
determining the directory path to the server object corresponding to the file name, and
responsive to the directory path, generating the moniker including the directory path identifying the location in the system of the server object containing the linked data.

* * * * *